INPUT-OUTPUT SYSTEM FOR A DIGITAL COMPUTER
Filed July 27, 1964 7 Sheets-Sheet 1
Fig. 1
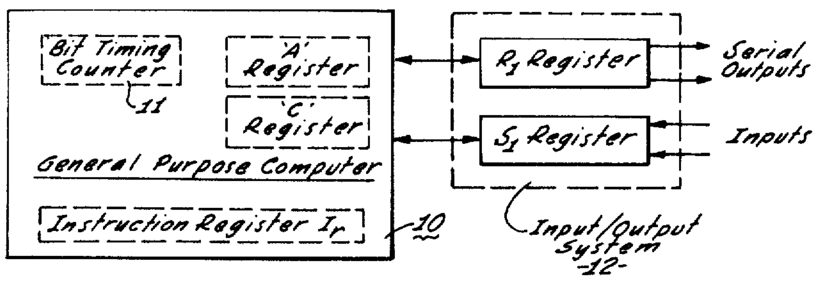
Fig. 2
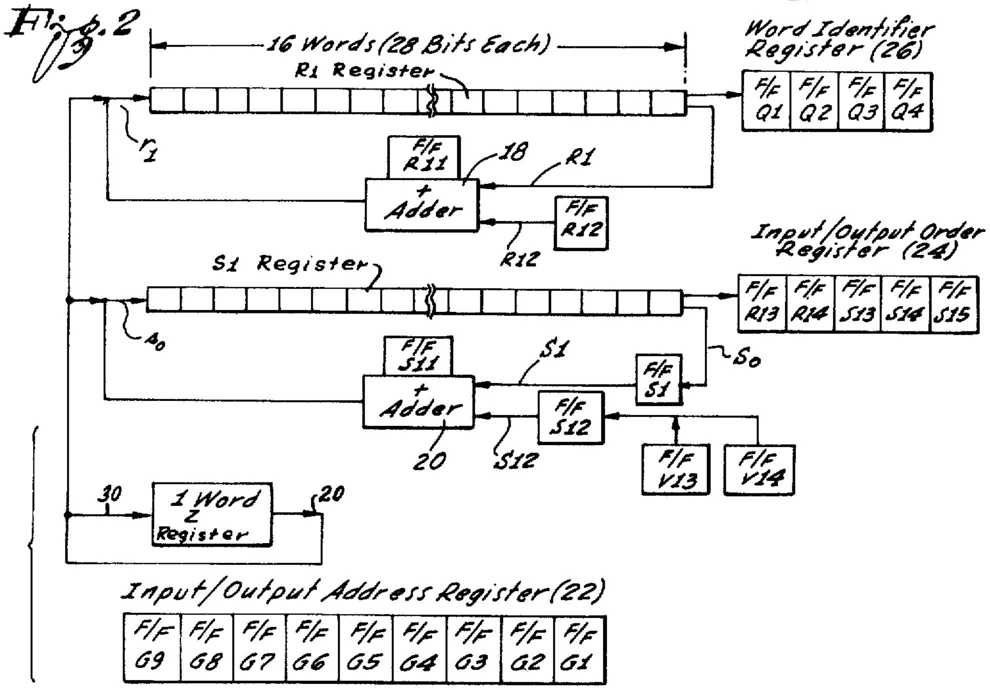
Fig. 3A (Word in R1 Register
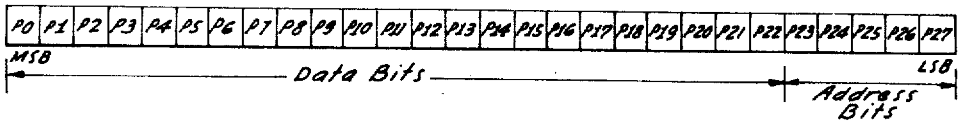
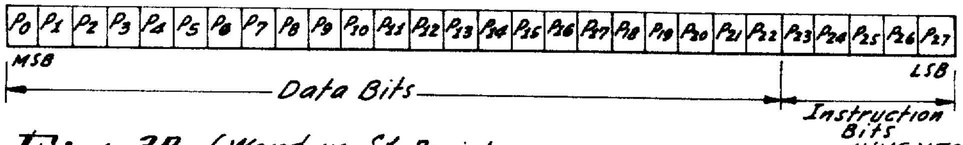
Fig. 3B (Word in S1 Register
INVENTORS
James E. Kinzie
John W. Pross, Jr.
Robert B. Steves
Arville T. Trostrud
By [signature]
Attorney Fig. 4 (Loading of Input/Output Instruction Register -24-

| Bit Time | S1 Register | | | | | $S_0$ | S1 | R13 | R14 | S13 | S14 | S15 |
|---|---|---|---|---|---|---|---|---|---|---|---|---|
| P1 | S15 | R13 | R14 | S13 | S14 | — | — | — | — | — | — | 0 |
| P0 | — | S15 | R13 | R14 | S13 | S14 | — | — | — | — | — | 0 |
| P27 | — | — | S15 | R13 | R14 | S13 | S14 | — | — | — | — | 0 |
| P26 | — | — | — | S15 | R13 | R14 | S13 | S14 | — | — | — | 0 |
| P25 | — | — DATA | — | — | S15 | R13 | R14 | S13 | S14 | — | — | 0 |
| P24 | — | — | — | — | — | S15 | R13 | R14 | S13 | S14 | — | 0 |
| P23 | — | — | — | — | — | — | S15 | R13 | R14 | S13 | S14 | 0 |
| P22 | — | — | — | — | — | — | — | R13 | R14 | S13 | S14 | S15 |

Order bits are designated by their destinations

Fig. 5 (Loading of Word Identifier Register -26-

| Bit Time | R1 Register | | | | | | R1 | Q1 | Q2 | Q3 | Q4 |
|---|---|---|---|---|---|---|---|---|---|---|---|
| P1 | Q1 | Q2 | Q3 | Q4 | LSD | — | — | — | — | — | — |
| P0 | — | Q1 | Q2 | Q3 | Q4 | LSD | — | — | — | — | — |
| P27 | — | — | Q1 | Q2 | Q3 | Q4 | LSD | — | — | — | — |
| P26 | — | — | — | Q1 | Q2 | Q3 | Q4 | LSD | — | — | — |
| P25 | — | — DATA | — | — | Q1 | Q2 | Q3 | Q4 | LSD | — | — |
| P24 | — | — | — | — | — | Q1 | Q2 | Q3 | Q4 | LSD | — |
| P23 | — | — | — | — | — | — | Q1 | Q2 | Q3 | Q4 | LSD |
| P22 | — | — | — | — | — | — | — | Q1 | Q2 | Q3 | Q4 |
| P21 | — | — | — | — | — | — | — | Q1 | Q2 | Q3 | Q4 |

Word Identifier bit are designated by their destinations

INVENTORS:
James E. Kinzie
John W. Pross, Jr.
Robert B. Steves
Arville T. Trostrud
By [signature]
Attorney Fig. 6 (Write into R1 or S1 Registers)(Ḡ1·G3)
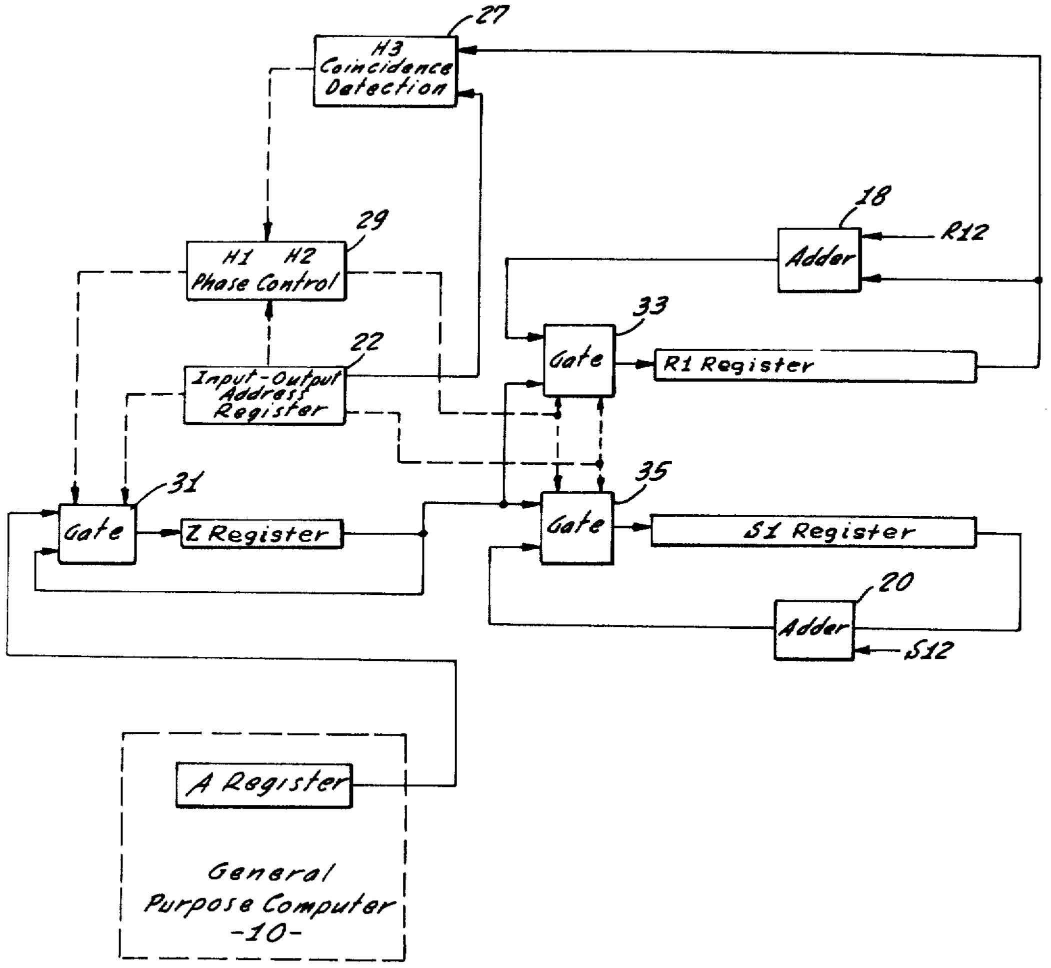
INVENTORS:
James E. Kinzie
John W. Dross, Jr.
Robert B. Steves
Arville T. Trostrud
By [signature]
Attorney

INPUT-OUTPUT SYSTEM FOR A DIGITAL COMPUTER

Filed July 27, 1964 7 Sheets-Sheet 4

INVENTORS:
James E. Kinzie
John W. Pross, Jr.
Robert B. Steves
Arville T. Trostrud
By [signature]
Attorney INVENTORS:
James E. Kinzie
John W. Pross, Jr.
Robert B. Steves
Arville T. Trostrud
By [signature]
Attorney

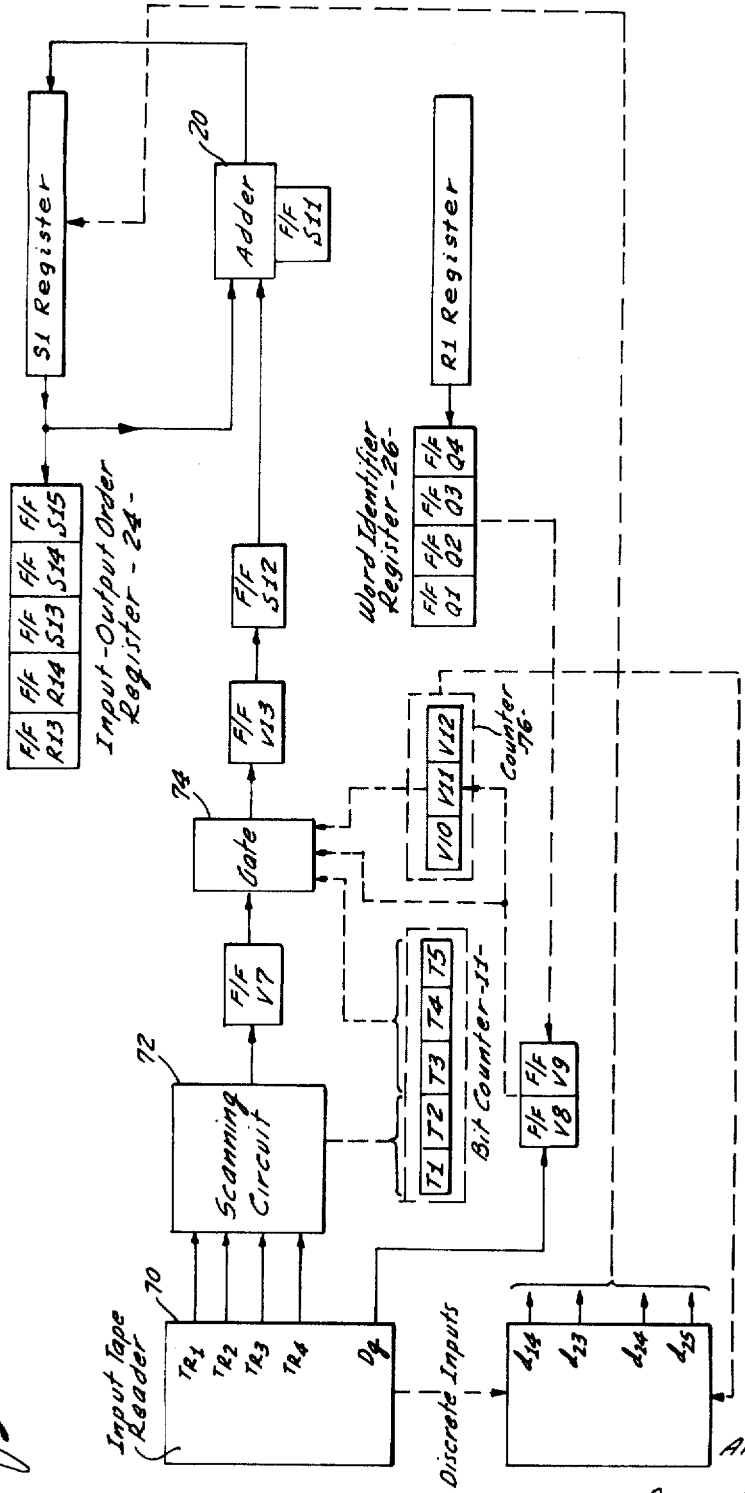
Fig. 11 (Input Tape Reader Operation)
INVENTORS
James E. Kinzie
John W. Pross, Jr.
Robert B. Steves
Arville T. Trostrud
By [signature]
Attorney Fig. 12 (Pulse Output Operations)
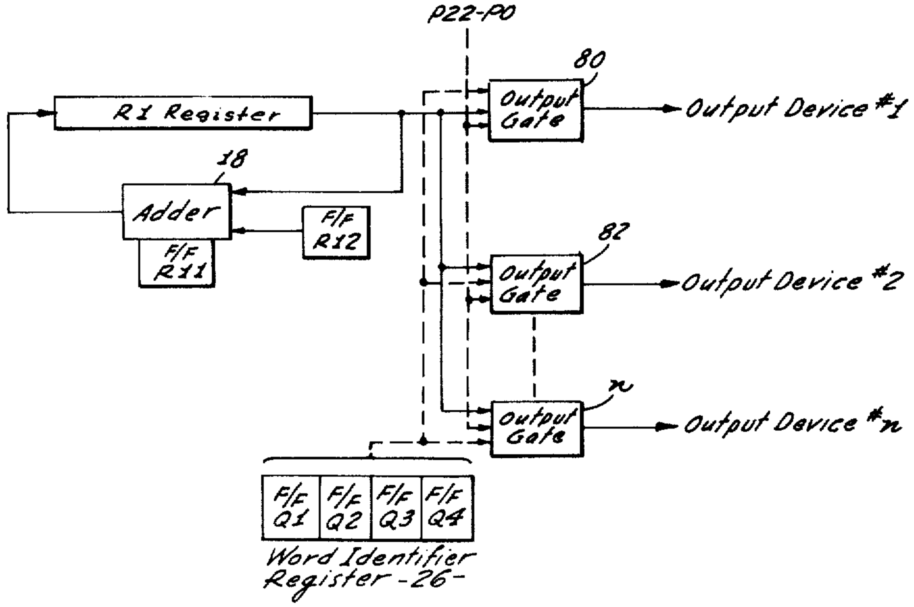
Fig. 13 (Serial Output Operations)
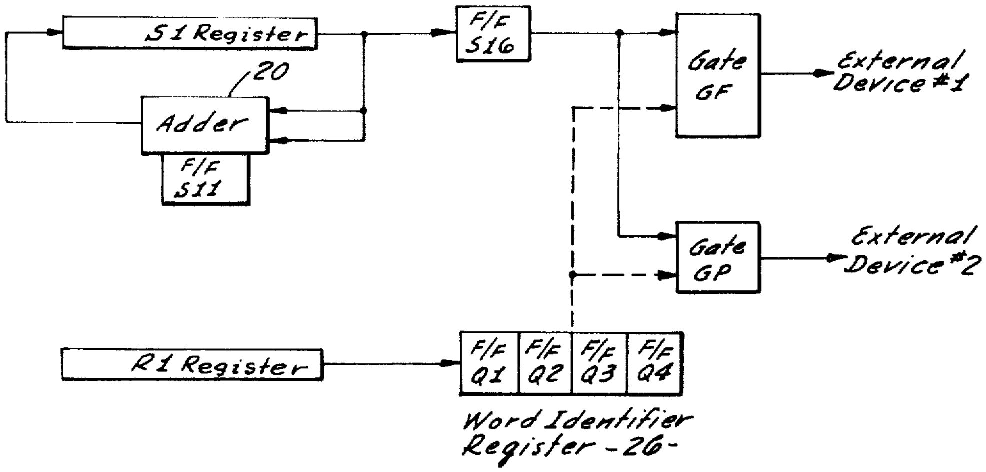
INVENTORS:
James E. Kinzie
John W. Pross, Jr.
Robert B. Steves
Arville T. Trostrud
By [signature]
Attorney 3,328,566
Patented June 27, 1967

3,328,566

INPUT-OUTPUT SYSTEM FOR A DIGITAL COMPUTER

James E. Kinzie, Oceanside, John W. Pross, Jr., Escondido, Robert B. Steves, Vista, and Arville T. Trostrud, Encinitas, Calif., assignors to General Precision, Inc., a corporation of Delaware Filed July 27, 1964, Ser. No. 385,280
9 Claims. (Cl. 235—165)

The present invention relates to electronic digital computers, and the like, and it relates more particularly to an improved input-output system for use in conjunction with a general purpose digital computer to serve, not only as an input and output buffer for the computer, but also to extend the capabilities of the computer so as to render it particularly suited, for example, for vehicle guidance purposes.

The input-output system to be described, as mentioned above, not only serves as a buffer for the information read into or out of the associated general purpose computer, but it is also programmable to perform additional operations which are beyond the normal capabilities of the general purpose computer.

For example, the input-output system of the invention is capable of performing real time integrations, and this operation may be performed independently of the operation of the general purpose computer and without interrupting the normal operation of the general purpose computer.

The input-output system of the invention is also capable of performing such operations as accepting random pulse inputs, high speed integration, calculating cut-off velocities, transmitting data link information, presenting digital outputs to shaft encoders and the like, and so on.

It is an object of the present invention, therefore, to provide an improved input-output system for use in conjunction with a general purpose computer, which system serves not only as a buffer for inputs and outputs of the computer, but which is capable itself of performing certain programmable functions so as to extend the capabilities of the computer.

A further object of the invention is to provide such an improved input-output system which is simple in its concept and which uses a minimum of components and associated logic circuitry to achieve its intended purpose.

In the embodiment to be described, for example, one or more pairs of delay lines are used in the input-output system, as circulating registers. These delay lines may be of the glass type, or any other suitable kind may be used. Present glass technology makes it possible to achieve storage of digital information up to 30 megacycle bit rates on glass delay lines, and over a wide temperature range without affecting to any appreciable extent the delay characteristics of the delay line.

The input-output system to be described incorporates one pair of delay lines as circulating registers therein. However, it will be understood that the system is flexible, and that additional pairs of delay lines may be incorporated into the system, depending upon the input-output requirements of the particular installation in which the system is incorporated.

In the drawings:

FIGURE 1 is a block diagram showing a general purpose computer and an associated input-output system, the input-output system may be constructed in accordance with the present invention;

FIGURE 2 is a schematic block diagram of the principal components incorporated into the input-output system of FIGURE 1;

FIGURES 3A and 3B are schematic representations of the manner in which information is stored in the components of the system of FIGURE 2;

FIGURES 4 and 5 are tables showing the manner in which data is shifted in certain registers in the system;

FIGURE 6 is a schematic representation of the manner in which information may be fed from the computer to the input-output system;

FIGURE 11 is a schematic representation of an input circuit for feeding tape reader and keyboard inputs into the input-output system; and FIGURES 12 and 13 are schematic representations of certain output operations to be performed by the input-output system.

Figure 7:
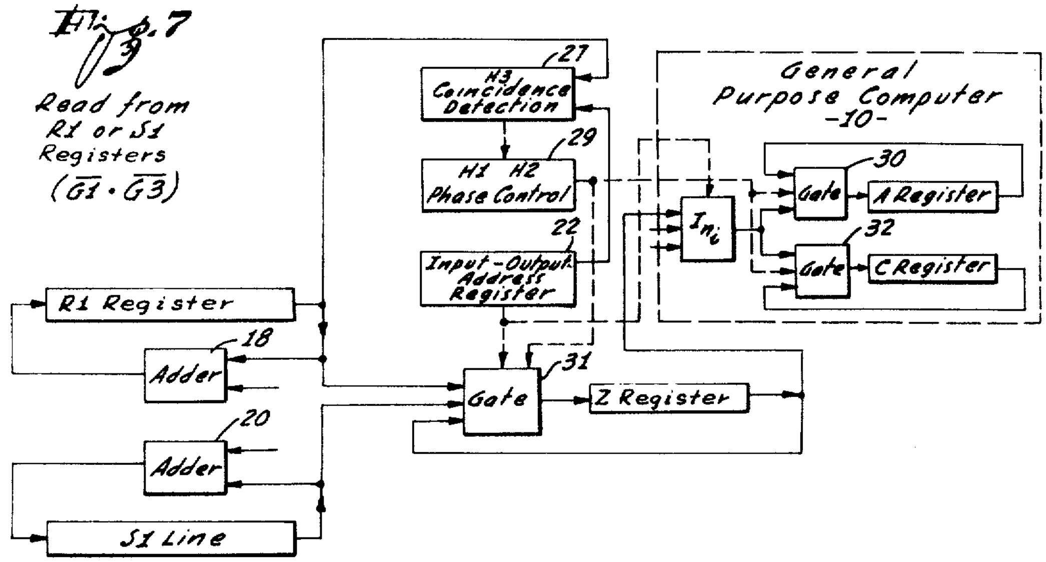
FIGURE 7 is a schematic representation of the manner in which information may be read from the input-output system into the computer.

The input-output system to be described performs three general types of operations, these being:

A. Communication with the arithmetic section of the associated general purpose computer.

B. Communication with external equipment.

C. Performance of internal operations.

As shown in FIGURE 1, the general purpose computer is represented by the block 10. The computer 10 handles negative numbers on a two's complement basis, as will be described. Coupled to the general purpose computer is an input-output system 12. This system includes a circulating register desginated R1, from which pulse outputs are derived. The input-output system 12 also includes a circulating register S1 which receives inputs from external equipment. Additional pairs of R1 and S1 registers may be incorporated in the input-output system, depending upon the requirements of the particular installation. Information circulates through the computer as 27-bit words and these words each circulate in P28–P0 successive bit times. The information is timed by a bit counter 11 which is made up of flip-flops T1–T5.

As shown in FIGURE 2, the input-output system 12 further includes a one-word circulating register Z; an input-output address register 22 (G1–G9); an input-output order register 24 (R13, R14, S13, S14, S15); and a word identifier register 26 (Q1–Q4). Each of the aforesaid components is in itself well known to the digital computer art, and a detailed description of the elements and circuitry which go to make up the individual components is deemed to be unnecessary herein.

The Z register as shown in FIGURE 2 may, for example, be a twenty-eight bit, one-word, recirculating glass line register. This register is used as a buffer between the arithmetic section of the computer 10 of FIGURE 1 and the R1, S1 registers in the input-output system 12. The output of the Z register will be designated herein as ZO and its input will be designated $z_0$. The Z register is synchronized with the circulating registers in the arithmetic section of the general purpose computer 10.

The R1 register, as shown in FIGURE 2, may be, for example, a sixteen word recirculating glass line register. The twenty-three bits (P22–P0) of greater significance in each word in the R1 register are used for data, and the five bits (P27–P23) of lesser significance are used as address bits to identify words in both the R1 and S1 registers (see FIGURE 3A).

A two-input adder network 18 of any suitable construction is included in the loop of the R1 register. One input to the adder is the output R1 from the R1 register, and the other is a selection flip-flop R12. The input $r_1$ to the R1 register is either the output from the adder 18, or the output (ZO) from the buffer register Z. The R1 register is synchronized as to bit times with the Z register and with the other circulating registers in the computer 10.

The S1 register is also a sixteen word recirculating register, synchronized with the R1 and Z registers, and with the registers in the computer 10. The S register is actually 15 words and 27 bits long, and is extended to the full 16 words by a flip-flop S1. As shown in FIGURE 3B, the twenty-three greater significant bits (P22–P0) in each word of the S1 register are used for data, and the five lesser significant bits (P27–P23) act as instruction bits to control the operation of both the S1 and R1 registers.

A two-input adder network 20 of usual construction is included in the loop of the S1 register. One input to the adder 20 is the output S1 of the S1 flip-flop, and the other is the output of a selection flip-flop S12. The input $s_0$ to the S1 register is either the output of the adder 20 or the output of the buffer register Z.

The input-output address register 22 is composed of nine flip-flops G1–G9. When an input-output instruction (INO) from the general purpose computer 10 is to be executed, the nine-bit address portion of the instruction is placed in the input-output address register 22. This address indicates, for example, the location in the R1 register at which a word is to be placed when an output operation is to be performed; or, for example, the location in the S1 register from which a word is to be selected when an input operation is to be performed.

The input-output order register 24 includes the flip-flops R13, R14, S13, S14 and S15. The order register receives the instruction bits of each word in the S1 register, these instruction bits being shifted into the register at the beginning of each word time. During the remainder of the word time, the order information represented by the least significant five bits is held in the order register 24 to control the operation of the S1 and R1 registers.

The flip-flops R13 and R14 hold the order for the R1 register, and the flip-flops S13 and S14 hold the order for the S1 register. The flip-flop S15 provides a special control. When the flip-flop S15 is set, the flip-flops S14, S13, R14 and R13 are prevented from changing, so that they hold the previous order for the following word time. The five least significant bits of the following word are not permitted to enter the order register 24, so that the entire word may, under such conditions, be used for data.

The input-output system to be described utilizes delay flip-flop logic, each flip-flop having a single input and, when clocked, assuming the state of the input logic. Each flip-flop also includes "clock allow" (C.A.) input logic which can inhibit the clock (where indicated).

The flip-flops R13, R14, S13, S14 form a four-bit shift register in the order register 24, reading the line S1 in the order indicated from P27 to P23 bit times. The flip-flop S15 does not receive its setting until P23 bit time, allowing the other four flip-flops to shift. In those cases where S15 is set at P23 bit time, it is not reset until the second P0 bit time, so that the flip-flops R13, R14, S13 and S14 hold the same order for two word times. The manner in which information is shifted from the S1 register into the order register 24 is shown in the table of FIGURE 4.

The word identifier register 26 is a four flip-flop shift register, and it includes the flip-flops Q1–Q4. This register receives the P26–P23 address bits of each word in the R1 line each word time (FIGURE 5). During the remainder of the word time, the address information is held in the word identifier register flip-flops Q1–Q4.

Data transfer to and from the arithmetic section of the general purpose computer 10 of FIGURE 1 and the R1 and S1 registers in the input-output system takes place under the control of an input-output instruction (INO) originating in the computer.

For example, as illustrated schematically in FIGURE 6, data contained in the accumulator register A in the arithmetic section of the computer 10 may be transferred to a chosen word position in the R1 register or in the S1 register, by means of the INO instruction. The address portion of the INO instruction is fed into the input-output address register 22 of FIGURE 2. In this register, the states of the flip-flops G1–G4 designate which of the two registers R1 or S1 is to receive the contents of the A register, and the states of the flip-flops G5–G9 indicate the particular word position in the selected register in which the contents are to be placed.

As mentioned above, in the input-output register 22, the states of the flip-flops G1–G4 indicate that a write operation from the A register is to take place into either the R1 or S1 registers. For example, $\overline{G1}\cdot\overline{G2}\cdot G3\cdot\overline{G4}$ indicates that a write operation into the R1 register is to take place; and $\overline{G1}\cdot G2\cdot G3\cdot\overline{G4}$ indicates that a write operation into the S1 register is to take place. The write operation of FIGURE 6 itself is designated by $\overline{G1}\cdot G3$.

The states of the flip-flops G5–G9, as noted above, specify the particular word position in the selected R1 or S1 register in which the information from the A register is to be placed during the aforesaid write operation. When such a write operation into the S1 or R1 register is designated by the states of the flip-flops G1–G4, the contents of the A register are transferred to the Z register during the next word time.

Then, a search begins for coincidence between the states of the flip-flops G5–G9 and the word identifying address codes which appear successively in the word identifier register 26. When coincidence is achieved, the word in the Z register is shifted into the R1 or S1 register through respective gates 33 or 35, depending upon the configuration of the G1–G4 flip-flops in the input-output address register 22, as explained above. The gates normally complete the respective circulation paths from the adders 18 and 20.

Three flip-flops provide the controls for the aforesaid operations, namely the flip-flops H1, H2 and H3. The flip-flops H1 and H2 in a phase control circuit 29 provide phase control, and the flip-flop H3 in a coincidence detector circuit 27 indicates when coincidence is achieved. These circuits, per se, can be of any appropriate known construction. Four phases are involved in the operation, as represented by the following table:

| Phase | Duration | H1 | H2 | H3 |
|---|---|---|---|---|
| Stand-by | At least one word time | 0 | 0 | 0 |
| Transfer contents of A register to Z register. | One word time | 1 | 0 | 0 |
| Search for coincidence | One sixteen word times | 1 | 1 | 0 |
| Transfer word from Z register a to selected position in R1 or S1 a register. | One word time | 0 | 1 | 1 |

The coincidence flip-flop H3 performs its function at all times, having no dependence on the flip-flops H1 or H2. However, the flip-flop H3 is not utilized until the flip-flop H1 is set. During the search phase, the flip-flip H3 is sampled each P0 bit time, and if it is in its reset state at that time, the indication is that coincidence was not found. The flip-flop H3 is then set at P0 bit time, and it samples G9 and R1 from P27–P23 bit times. If during that time, G9 and R1 are dissimilar, H3 is reset.

$$h_3=P0$$

(where $h_3$ is the set input to the flip-flop H3)

$$\text{C.A.}=(R1\overline{G9}+\overline{R1}G9)(P27-P23)+P0$$

(where C.A., as previously defined, is "clock allow" input logic)

It should be noted that, due to the aforesaid skewing of the word identifying address codes in the R1 register, the data in the Z register is shifted into the word position of the selected R1 or S1 register following the word in which coincidence was detected.

During the aforesaid $H1\cdot\overline{H2}$ phase, the Z register copies the contents of the A register and then recirculates. During the subsequent $\overline{H1}\cdot H2$ phase, either the R1 or S1 register copies the contents of the Z register, as determined by the state of the flip-flop G2 in the address register 22. When the R1 or S1 registers are not ordered to copy the contents of the Z register, they copy their respective adders 18 or 20, as shown in FIGURE 6.

$$z_0=A27H1\overline{H2}G3+Zo(\overline{H1}+H2G3)$$

(where $z_0$ is the input to the Z register)

$$r_1=Zo\overline{H1}H2\overline{G2}G3+(R1\text{ adder})\overline{\overline{H1}H2\overline{G2}G3}$$

(where $r_1$ is the input to the R register)

$$s_0=Zo\overline{H1}H2G2G3+(S1\text{ adder})\overline{\overline{H1}H2\overline{G2}G3}$$

(where $s_0$ is the input to the S register)

During the aforesaid write operation ($\overline{G1}\cdot G3$) illustrated in FIGURE 6, a full twenty-eight bit word is transferred from the computer 10 into the R1 or S1 register of the input-output system. Therefore, the aforesaid word identification code for each word in the R1 register, and the aforesaid order code for each word in the S1 register is written into the selected register at the proper bit times during the aforesaid data transfer operation.

The operation, whereby information from a selected word position in the R1 or S1 register of the input-output system 12 may be read into the A and C registers of the arithmetic section of the general purpose computer 10, is shown schematically in FIGURE 7.

The purpose of the aforesaid read operation, as noted, is to bring a selected word from either the R1 or S1 registers of the input-output system into the A and C registers of the general purpose computer 10. Two INO instructions are required for the read operation.

The first instruction comprises the "prime" command which causes the selected word to be brought from the R1 or S1 register through a gate 31 into the Z register when the flip-flop H3 in the coincidence detector 27 indicates coincidence between the states of the G5–G8 flip-flops in the input-output address register 22 and the successive word identifier codes fed into the word identifier register 26.

The second instruction, which is identical to the "prime" command, transfers the contents of the Z register through a selection gate I$ni$ and through gates 30 and 32 into both the A and C registers in the arithmetic section of the computer 10. The gate I$ni$ responds to the selected state of the flip-flops H1 and H2 in the phase control circuit 29 to pass the contents of the Z register to the gates 30 and 32. These latter gates respond to the same state of the flip-flops H1 and H2 to break the A and C register circulation loops and to pass the contents of the Z register to the A and C registers.

As mentioned above, the states of the flip-flops G1–G4 in the input-output address register 22 indicates that the read operation is to take place. This read operation selects a word from the R1 register for $\overline{G1}\cdot\overline{G2}\cdot\overline{G3}\cdot\overline{G4}$ states of the aforesaid flip-flops, and from the S1 register for $\overline{G1}\cdot G2\cdot\overline{G3}\cdot\overline{G4}$ states of the flip-flops.

The phasing control for the read operation $\overline{G1}\cdot\overline{G3}$ of FIGURE 7 is provided by the flip-flops H1 and H2 in the phase control circuit 29, and coincidence detection is provided by the flip-flop H3 in the coincidence detector 27. The phase sequence for the read operation is the same as for the aforedescribed write operation. This sequence may be represented by the following table:

| Function | Duration | H1 | H2 |
|---|---|---|---|
| Stand-by | At least one word time | 0 | 0 |
| Search | One to sixteen word times | 1 | 0 |
| Transfer R1 or S1 to Z | One word time | 1 | 1 |
| Transfer Z to A and C | One word time for transfer | 0 | 1 |

The flip-flop H1 in the phase control circuit 29 is set when the read operation order $\overline{G1}\cdot\overline{G3}$ is placed in the input-output address register 22, thereby initiating the search phase. The flip-flop H2 in the phase control circuit indicates in the manner described above when a coincidence is detected.

$$h_1=\overline{H2}$$

(where $h_1$ is the set input for the flip-flop H1)

$$h_2=\overline{H1}$$

(where $h_2$ is the set input for the flip-flop H2)

$$\text{C.A. for } H1 \text{ and } H2=P0(\overline{H1}\cdot\overline{H2}\cdot\overline{G1}\cdot INO+H1\cdot H3)$$

When the flip-flops H1 and H2 are both set, a selected word from the R1 or S1 register is transferred through the gate 31 to the Z register. This transfer phase ($H1\cdot H2$) lasts one word time, as shown in the above table, and H1 is then reset. H2 remains set, however, until the second INO instruction is programmed to transfer the data from the Z register through the gate I$ni$ and through the gates 30 and 32 into the A and C registers of the arithmetic section of the general purpose computer 10.

$$h_1=\overline{H2}$$
$$h_2=\overline{H1}$$
$$\text{C.A. for } H1 \text{ and } H2=P0(H1\cdot H2\cdot\overline{G3}+\overline{H1}\cdot H2\cdot INO)$$

The programming of the second INO instruction may be delayed indefinitely. During this interval, the selected word circulates in the Z register. Moreover, a minimum of seventeen word times must intervene between the two INO instructions to be sure that the $\overline{H1}\cdot H2$ phase has been entered.

It will be understood, therefore, that the Z register, during the first transfer operation ($H1\cdot H2$) of the read operation ($\overline{G1}\cdot\overline{G3}$) of FIGURE 7, copies the selected word from the selected R1 or S1 register so long as the flip-flop H1 is set. Thereafter it recirculates. The word transferred to the Z register is the one on the R1 or S1 register following the one in which coincidence was detected, due to the aforesaid address skew arrangement.

The A and C registers in the arithmetic section of the general purpose computer 10 copy the Z register through the selection gate I$ni$, and through the gates 30 and 32, when the second INO command is programmed. The state of the flip-flop H2 distinguishes the two identical INO commands. The R1 and S1 registers are not affected by the aforesaid read operation.

$$z_0=(R1\cdot\overline{G2}\cdot\overline{G4}+S1\cdot G2\cdot\overline{G4})H1\cdot\overline{G3}+Z0\cdot\overline{H1}$$
$$gin_1=Zo\cdot\overline{G1}$$
$$r_1=(\text{R1 register adder})\ \overline{\overline{H1}\cdot H2\cdot\overline{G2}\cdot G3}$$
$$s_0=(\text{S1 register adder})\ \overline{\overline{H1}\cdot H2\cdot\overline{G2}\cdot G3}$$

The word read into the A and C registers of the arithmetic section of the computer 10 during the read operation $\overline{G1}\cdot\overline{G3}$ of FIGURE 7 is a full twenty-eight bit word. The word, therefore, contains either the word identifier address bit (if selected from the R1 register or the order code instruction bits (if selected from the S1 register).

The input-input system 12 is also capable of performing certain internal operations. As mentioned above, and as shown in FIGURE 8, the adder 18 is included in the recirculation loop of the R1 register. The adder inputs are the output of the R1 register and the flip-flop R12. A carry flip-flop R11 is associated with the adder 18. The flip-flops R13 and R14 in the input-output order register 24 control the flip-flop R12 and the adder carry flip-flop R11.

The four internal operations of the R1 circulating register are, for example, as follows:

| Operation | R13 | R14 | R12 (Input) |
|---|---|---|---|
| Recirculate | 0 | 0 | 0 |
| Add S1 register | 0 | 1 | S0 |
| Propagate carry | 1 | 0 | R11 |
| Add 1 | 1 | 1 | +1 |

Irrespective of the input-output order code in the register 24, the five least bits of each word in the R1 and S1 registers must be recirculated without alteration to preserve the word identification code. During the following twenty-three bit times, however, the output from the adder 18 is fed to the input of the R1 register, except when the R1 register is ordered to read the Z register.

During the recirculate phase ($\overline{R13}\cdot\overline{R14}$) of the R1 circulating register, the register acts as a temporary storage for the information stored therein, and such information is recirculated without change until needed. In this operation, the flip-flop R12 receives a clock pulse at P23 bit time which resets the flip-flop and causes it to remain reset throughout the entire operation. The carry flip-flop R11 is likewise reset throughout the entire operation. The R1 register, therefore, recirculates without change for the recirculate phase, since the controlling term in the adder 18 is $R1\cdot\overline{R11}\cdot\overline{R12}$.

The recirculation phase $\overline{R13}\cdot\overline{R14}$ may be expressed logically as:

$$r_{12}=0;\ \text{C.A.}=(P0-P24)\overline{R13}$$
$$r_{11}=\overline{P23}\cdot\overline{R11};\ \text{C.A.}=P23\cdot\overline{R13}+(R1\cdot R12\cdot\overline{R11}+\overline{R1}\cdot\overline{R12}\cdot R11)(\overline{P27-P23})$$

The "add S1 register" phase ($\overline{R13}\cdot R14$) is one in which a corresponding word in the S1 register is added to a selected word in the R1 register. This operation is appropriate for intergration purposes. For example, different words in the S1 register may be used to store velocity terms along three axes, and these terms may be changed in response to plus or minus velocity increments received by the S1 register, as will be described. Then, each "add S1 register" operation results in an integration in the corresponding R1 register word, so that distance terms along the same three axes may be accumulated on the R1 register.

For the "add S1 register" phase ($\overline{R13}\cdot R14$), the flip-flop R12 copies S0, the output from the S1 register. The S1 register is copied one bit short, the extra bit of delay being made up in the flip-flop R12. The carry flip-flop R11 is reset at P23 bit time, and it functions as a normal carry flip-flop for the remainder of that word time. This phase can be expressed logically as:

$$r_{12}=S0\cdot\overline{R13}\cdot R14;\ \text{C.A.}=(\overline{P0-P24})\overline{R13}$$
$$r_{11}=\overline{P23}\cdot\overline{R11};\ \text{C.A.}=P23\cdot\overline{R13}+(R1\cdot R12\cdot\overline{R11}+\overline{R1}\cdot\overline{R12}\cdot R11)(\overline{P27-P23})$$

The "propagate carry" operation ($R13\cdot\overline{R14}$) permits a carry to be propagated in to the next word for multiple word length operations. For this operation, a carry generated at P0 bit time of the previous word is applied to the adder 18 at P23 bit time to be ready for the first bit of addition at P22 bit time.

The flip-flop R12 is used for sign extension. At P0 bit time of the previous operation, the flip-flop R12 contains the sign of the selected operand. As long as the "propagate carry" instruction ($R13\cdot\overline{R14}$) is programmed, no clock pulse is allowed to reach the flip-flop R12. The flip-flop R12 can be set at P0 bit time only during an "add S1 register" operation ($\overline{R13}\cdot R14$), and when the S1 word is negative.

The carry flip-flop R11 computes the last carry from the previous operation at P0 bit time, and it receives no further clock pulses until the next P22 bit time, the reset term at P23 bit time being disabled. The carry flip-flop R11 operates normally after P23 bit time.

It will be appreciated that the "propagate carry" instruction ($R13\cdot\overline{R14}$) may be programmed in two or more successive word times.

The "add 1" operation ($R13\cdot R14$) provides a means for accumulating real time, for example, and a double length word is normally used for this operation. For the "add 1" phase, the carry flip-flop R11 is forced to its set state at P23 bit time, effectively adding +1 to the word. After P23 bit time, the carry flip-flop R11 operates normally. This operation can be expressed logically as:

$$r_{12}=0;\ \text{C.A.}=(\overline{P0-P24})R14$$
$$r_{11}=P23\cdot R13\cdot R14+\overline{P23}\cdot R11;\ \text{C.A.}=(R1\cdot R12\cdot\overline{R11}+\overline{R1}\cdot\overline{R12}\cdot R11)(\overline{P27-P23})+P23\cdot R14$$

Figure 9:
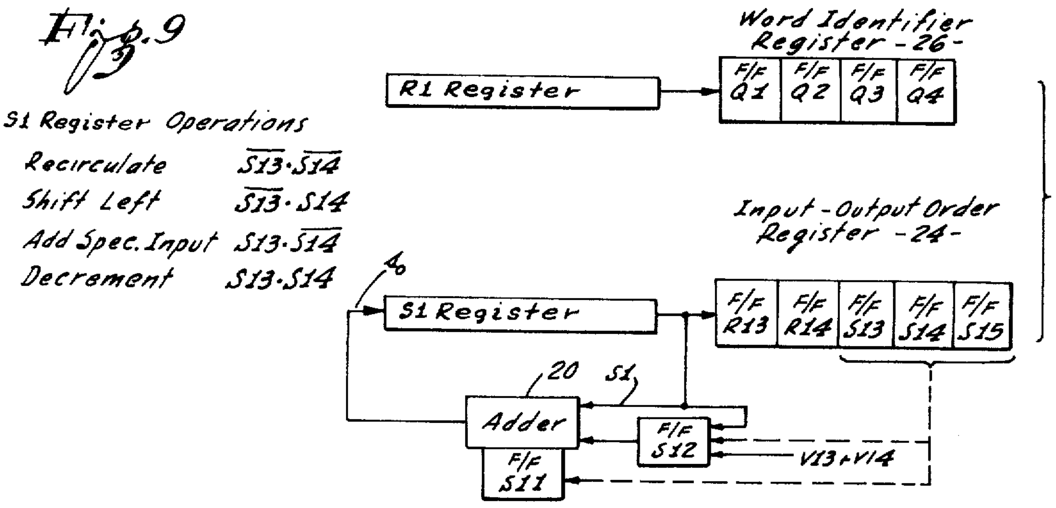

The S1 circulating register is also capable of performing certain internal operations, and for that purpose the adder 20 is included in its recirculation loop as shown in FIGURE 9. The inputs to the adder 20 include the output S1 of the register, and the flip-flop S12. The adder 20 has a carry flip-flop S11 associated with it. The states of the flip-flops S13 and S14 in the input-output order register 24 (FIGURE 2) govern the operation of the flip-flop S12 and of the carry flip-flop S11.

The four internal operations of the S1 register may, for example, be as follows:

| Operation | S13 | S14 | S12 (Input) |
|---|---|---|---|
| Recirculate | 0 | 0 | 0 |
| Shift left | 0 | 1 | S0 |
| Add special input | 1 | 0 | (1) |
| Decrement | 1 | 1 | −1 |

(1) V13 or V14.

As mentioned above, irrespective of the order code in the order register 24, the five least significant bits of each word in the S1 register must be recirculated unchanged so as to preserve the instruction bits of the order code. During the following twenty-three bit times, however, and as mentioned above, the output of the adder 20 is fed to the input of the S1 register, except when the register is ordered to read the Z register. If the Z register is copied, a full twenty-eight bit word is read into the register.

The fifth flip-flop S15 in the input-output order register 24, when set, as explained above, prohibits the changing of the order register, thus freeing the following word from devoting five of its bits to an order code.

The S1 adder 20 differs somewhat from the R1 adder 18. Recirculation of the order code takes place through the adder 20 by assuring that the carry flip-flop S11 and the flip-flop S12 are reset during P27–P24 bit times.

$$s_0=\overline{(\overline{H1}\cdot H2\cdot G2\cdot G3)}(S11\cdot\overline{S12S1}+\overline{S11}\cdot S12\cdot\overline{S1}+\overline{S11}\cdot S12\cdot S1+S11\cdot S12\cdot S1)$$

As in the case of the R1 register, the S1 register can perform a temporary storage function by being placed in a recirculate phase ($\overline{S13}\cdot\overline{S14}$). During this phase, the carry flip-flop S11 is reset at P0 of the previous word, and the flip-flop S12 is reset. The entire word designated by this order will circulate due to the $S1\cdot\overline{S11}\cdot\overline{S12}$ term applied to the adder 20.

This phase may be expressed as:

$$s_{12}=0$$
$$s_{11}=\overline{S11}\cdot\overline{P0}$$
$$\text{C.A.}=P0$$

The shift left operation ($\overline{S13}\cdot S14$) is useful in telemetry, for example, during which the word must be precessed by a one bit shift for each word time. For this operation, the number on the S1 register is applied as both the inputs to the adder 20, and as is well known, the resulting addition results in a left shift. The carry flip-flop S4 operates normally during this operation. This operation can be expressed logically as:

$$s_{12}=S0\cdot S14(\overline{P0-P24})$$
$$s_{11}=\overline{S11}\cdot\overline{P0}$$
$$\text{C.A.}=S1\cdot S12\cdot\overline{S11}+\overline{S1}\cdot\overline{S12}\cdot S11+P0$$

The "add special input" phase ($S13\cdot\overline{S14}$) causes the term V13 or V14 to be added to the particular word in the S1 register. The V13 and V14 terms may originate in an input circuit to be described in conjunction with FIGURE 10. As will be described, this circuit responds to increments to set the flip-flop V13 for positive increments and to set the flip-flop V14 for negative increments. Then, a word representing velocity, for example, in the S1 register may be increased or decreased by 1 during the particular phase, in response to a corresponding increment increase or decrease in velocity. This operation can be expressed as:

$$s_{12}=(V13+V14)S13(\overline{P0-P24})$$

The term $V13+V14$ is added to the word in the S1 register, for the "add special input" operation, and the carry flip-flop S11 operates normally. It should be noted that when the flip-flop V13 is set, indicating a positive increment, the number 0 . . . 001 is added to the number in the S1 register; whereas, when the flip-flop V14 is set, indicating a negative increment, the number 1 . . . 1111 is added in accordance with the two's increment technique used in the illustrated embodiment of the invention.

For the "decrement" phase ($S13\cdot S14$), a word placed into the S1 register is counted down to zero. In this operation, the flip-flop S12 is set to 1 throughout the phase, which, as mentioned, is the two's complement form of −1. The carry flip-flop S11 operates normally during this operation. This latter phase can be expressed:

$$s_{12}=S13\cdot S14(\overline{P0-P24})$$

Figure 10:
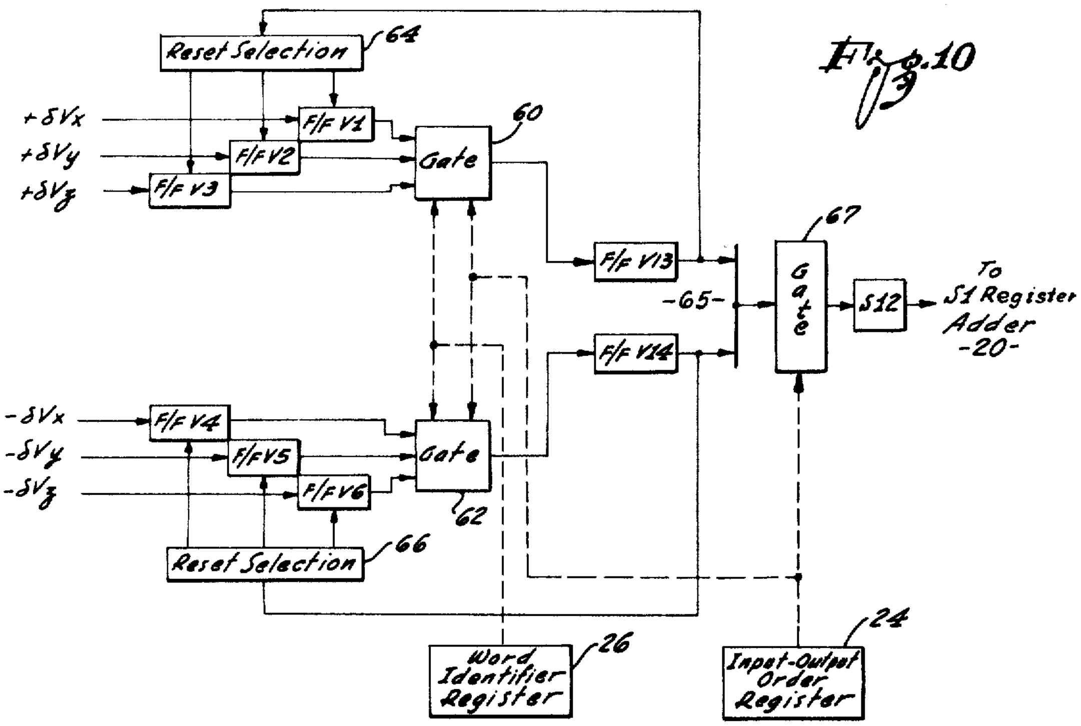
FIGURE 10 is a block representation of an input circuit for bringing a synchronous pulse inputs into the system of the invention.

The input-output system 12 may be constructed, as shown in FIGURE 10, to accept and add into corresponding words on the S1 register, three channels of asynchronous pulse inputs. Each channel, in turn, is designated to, accept both positive and negative inputs. These pulse inputs, as mentioned above, may represent positive or negative velocity increments along each of three axes.

Three flip-flops V1, V2 and V3 store the positive pulses $+\delta vx$, $+\delta vy$ and $+\delta vz$ until accepted; and three other flip-flops V4, V5 and V6 store the negative pulses $-\delta vx$, $-\delta vy$ and $-\delta vz$ until accepted. A corresponding one of the flip-flops V1–V6 is set asynchronously when a particular pulse is received.

Addition of the pulse input to the S1 register is accomplished through an "or" gate 65 and selection gate 67 to exert a control on the S12 flip-flop during the "add special input" order ($S13\cdot\overline{S14}$). Selection of the proper channel is effected by the control of the respective gates 60 and 62 by the word identification code in the word identifier register 26. This code also selects the proper word on the S1 register.

Transmission of the data to the S12 flip-flop is handled by the buffer flip-flops V13 and V14. Positive pulses are picked up by the flip-flop V13 through gate 60 at P24 bit time when indicated by the order code in the word identifier register 26. The flip-flop V13 remains set for one bit time thereafter, and this sets the flip-flop S12 at P22 bit time, thereby adding "1" to the least significant bit of the corresponding word in the S1 register.

Negative pulses are detected by the flip-flop V14 through gate 62, and when a negative pulse is detected, the flip-flop V14 is set at P24 bit time, and it remains set until the end of the word time. The flip-flop S12, copying the flip-flop V14, effectively adds −1 to the pulse accumulation word.

The flip-flops V13 and V14 cannot both be set simultaneously. The maximum allowable input pulse rate permits only one positive, or one negative pulse input per sampling period.

The input operations can be expressed logically as:

$$v_{13}=P24\cdot\overline{S13}\cdot R14(V1\cdot\overline{Q1}\cdot\overline{Q2}+V2\cdot\overline{Q1}\cdot Q2+V3\cdot Q1\cdot\overline{Q2})$$
$$v_{14}=(V4\cdot\overline{Q1}\cdot\overline{Q2}+V5\cdot\overline{Q1}\cdot Q2+V6\cdot Q1\cdot\overline{Q2})\overline{P0}$$
$$\text{C.A.}+P0+P24\cdot\overline{S13}\cdot R14$$
$$s_{12}S13(V13+V14)(\overline{P0-P24})$$

The Q1 and Q2 terms in the above equations for the flip-flops V13 and V14 represent the bits which will finally be set in the flip-flops Q3 and Q4 when the input-output word identifier register 24 stops shifting. Likewise, the $\overline{S13}\cdot R14$ term in V14 indicates $S13\cdot\overline{S14}$ (add special input).

The appropriate input flip-flop is reset when it detects that its input is accepted by the flip-flop V13 or V14:

$$\overline{v_1}=V13\cdot P23\cdot\overline{Q3}\cdot\overline{Q2}$$
$$\overline{v_2}=V13\cdot P23\cdot Q3\cdot\overline{Q2}$$
$$\overline{v_3}=V13\cdot P23\cdot\overline{Q3}\cdot Q2$$
$$\overline{v_4}=V14\cdot P23\cdot\overline{Q3}\cdot\overline{Q2}$$
$$\overline{v_5}=V14\cdot P23\cdot Q3\cdot\overline{Q2}$$
$$\overline{v_6}=V14\cdot P23\cdot\overline{Q3}\cdot Q2$$

The input-output system 12 is also capable of receiving inputs from external equipment such as tape readers, keyboards, and the like. Keyboard and tape reader inputs are read into the S1 register of the input-output system 12 through flip-flops V13 and S12, as shown in FIGURE 11. Data may be brought in in seven groups of four bits each, and assembled in a special word position on the S1 register. Once assembled, a discrete signal is issued to the general purpose computer 10.

The particular word may be subsequently derived from the S1 register and transferred to the computer by the read operation described above in conjunction with FIGURE 7. When the read operation has been completed, so that the word in question has been fed to the general purpose computer 10, the particular word position on the S1 register is cleared automatically, and is ready to receive the next input. During the formation of the above-mentioned special word, the flip-flop S15 in the input-output order register 24 is set, as described above, so that the previous order code may be obeyed, since the entire 28 bits of the particular word position are used for data, leaving no room for an order code.

The special word on the S1 register is designated "Flex Word #2." The preceding word on the S1 register is designated "Flex Word #1," where the order set up contains $S15=1$, as mentioned above, thereby preventing the order from changing during Flex Word #2. The word identification code for Flex Word #2 is, for example, $\overline{Q1}\cdot Q2\cdot Q3\cdot Q4$.

During each cycle of the S1 register, a control signal $Dg$ from the input tape reader 70 is tested during Flex Word #1 time, as identified by the word identification code $Q1\cdot Q2\cdot Q3\cdot Q4$, to determine whether valid data is being presented by the input tape reader 70.

Two flip-flop V8 and V9 assure that the output contacts are sampled only once for each cycle of the control signal $Dg$. The signal $Dg$ is true for approximately 0.05 second. The normal states for the flip-flops V8 and V9 are "1" and "0," respectively. V8 resets at P2 bit time of Flex Word #1 if $Dg\cdot\overline{V9}$ is true, and it remains true for one word time. If the flip-flop V8 is reset during Flex Word #1, the flip-flop V9 sets at P1 bit time, and it remains set until the control signal D$g$ goes false.

$$v_8=V9+\overline{V8}+\overline{Dg}$$
$$\text{C.A.}=(P2\cdot Q4\cdot Q3\cdot Q2)(Q1+\overline{V8})$$
$$v_9=Dg(\overline{V8}+V9)$$

During the word time that the flip-flop V8 is reset, four bits are transferred to the S1 register. The flip-flop V7 continuously scans the four output contacts of the tape reader (TR1–TR4) by means of a usual scanning circuit 72. The scanning circuit 72 is under the control of the T1 and T2 flip-flops in the bit counter 11 which alone constitute a four-state counter.

The flip-flop V13, in turn, copies the flip-flop V7 through a selection gate 74. Only four bits are to be copied through the gate 74 by the flip-flop V13 each time $V8=0$. The three most significant bits in the bit counter T3–T5 comprise a 7-state counter, each state lasting four bit times. The flip-flops T3–T5 thus provide a gate signal for the gate 74 which extends for four bit times and which serves to route the data into four particular bit positions in the S1 word.

The choice as to which of the seven states to select is dependent upon an eight-state binary counter 76 in the input-output system 12 which is made up of the flip-flops V10–V12. The binary counter 76, beginning at 0 receives one count pulse at P2 bit time, each time $V8=0$. Upon reaching the count of 7, the counter 76 holds its value until the computer programs a read instruction of the S1 register with respect to Flex Word #2. The counter then resets.

$$v_7=TR1\cdot\overline{T2}\cdot T1+TR2\cdot T1\cdot T2+TR3\cdot T2\cdot\overline{T1}+TR4\cdot\overline{T2}\cdot\overline{T1}$$
$$v_{13}=V7\cdot\overline{V8}(\overline{V10}\cdot\overline{V11}\cdot\overline{V12}\cdot T5\cdot\overline{T4}\cdot\overline{T3}\cdot+\overline{V10}\cdot\overline{V11}\cdot V12\cdot\overline{T5}\cdot T4\cdot\overline{T3}+\overline{V10}\cdot V11.\cdot\overline{V12}\cdot T5\cdot\overline{T4}\cdot T3+V11\cdot V12\cdot T5\cdot T4+V10\cdot\overline{V11}\cdot\overline{V12}\cdot\overline{T5}\cdot T4\cdot T3+V10\cdot V12\cdot\overline{T5}\cdot\overline{T4}\cdot T3+V10\cdot V11\cdot\overline{T5}\cdot\overline{T4}\cdot\overline{T3})$$
$$v_{10}=\overline{V10}\cdot GV42;\ \text{C.A.}=\overline{V8}\cdot V11\cdot V12\cdot P2$$
$$v_{11}=\overline{V11}\cdot GV42;\ \text{C.A.}=\overline{V8}\cdot V12\cdot P2$$
$$v_{12}=\overline{V12}\cdot GV42;\ \text{C.A.}=\overline{V8}\cdot P2$$

The data from the input tape reader 70 is positioned in the Flex Word #2 position of the S1 register in position such that the first four bits read in (during $\overline{V10}\cdot\overline{V11}\cdot\overline{V12}$) are the four most significant bit positions with the TR4 bit in the sign position.

The computer program does not perform a read operation on the Flex Word #2 until a discrete input term $d_{25}$ is true. The $d_{25}$ can be true only if V10, V11, V12 and one of three other discrete inputs is true, namely $d_{14}$, $d_{23}$ or $d_{24}$.

When the input data is being generated by the tape reader, $d_{14}$ will be true continuously. If the input information has been typed on the keyboard, $d_{23}$ will be true when the operator presses a button on the control panel indicating that the information represents the address of the next word to be typed. If the operator presses a button indicating a data entry, $d_{24}$ will be true.

When $d_{25}$ goes true, the computer proceeds to read in the word from Flex Word #2. This operation is detected by $\overline{GV42}$ resetting the V10–V12 counter and clearing Flex Word #2. It is important that the Flex Word #2 be zero at the beginning of the operation, because the order which enters each group of four bits is "Add Special Input" which adds S12 and S1.

$$d_{25}=V10\cdot V11\cdot V12(d_{14}+d_{23}+d_{24})$$
$$\overline{GV42}=S15\cdot H1\cdot H2\cdot\overline{G3}$$
$$\left.\begin{aligned}v_{10}&=\overline{V10}\cdot GV42\\ v_{11}&=\overline{V11}\cdot GV42\\ v_{12}&=\overline{V12}\cdot GV42\end{aligned}\right\}\text{C.A.}=\overline{GV42}$$
$$s_o=[Zo(\overline{H1}\cdot H2\cdot G2\cdot G3)+\overline{(\overline{H1}\cdot H2\cdot G2\cdot G3)}(S11\cdot\overline{S12}\cdot\overline{S1}+\overline{S11}\cdot S12\cdot\overline{S1}\cdot+\overline{S11}\cdot\overline{S12}\cdot S1\cdot+S11\cdot S12\cdot S1)]\ GV42$$

Figure 8:
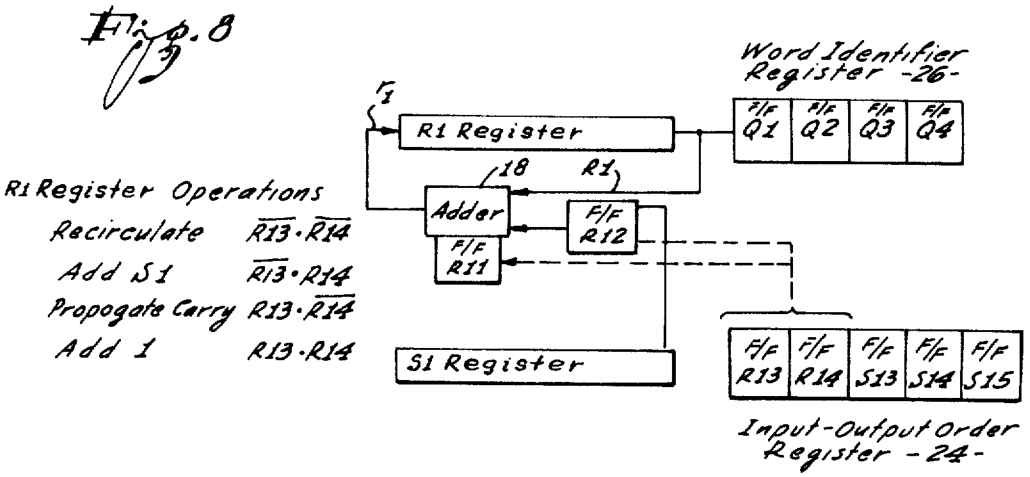
FIGURES 8 and 9 are schematic representations of the input-output system performing certain internal functions.

Pulse outputs (FIGURE 12) are produced on the R1 register by use of the "add S1 register" $\overline{R13}\cdot R14$) operation of FIGURE 8. A fixed value on the S1 register is added into a word on the R1 register for each cycle. Adder input flip-flop R12 contains, at P0 bit time, the sign of the word being read from the S1 register. When the word on the S1 register is positive, only positive output pulses will result; if negative, only negative output pulses will be produced.

Pulse output gates 80, 82 . . . $n$ go true for 4.6 microseconds (P22–P0) each time the sign of the word on the R1 register changes. Such a change is detected by noting the value of the carry flip-flop R11 into the sign digits. Multiple pulse outputs are identified by the word identifier code. It should be noted that the Q code appears in the word following that in which the "add S register" operation took place.

The maximum output rate for each channel is approximately 11.1 kilocycles with a 16 word line.

| Q1 | Q2 | Q3 | Q4 | |
|---|---|---|---|---|
| 1 | 1 | 0 | 0 | $\theta x$ |
| 1 | 1 | 0 | 1 | $\theta y$ |
| 1 | 1 | 1 | 0 | $\theta z$ |

$$r_{15}=\overline{R12}\cdot R11$$
$$r_{16}=R12\cdot\overline{R11}$$
$$+\theta x=Q1\cdot Q2\cdot\overline{Q3}\cdot\overline{Q4}\cdot R15(\overline{P27-P23})$$
$$-\theta x=Q1\cdot Q2\cdot\overline{Q3}\cdot\overline{Q4}\cdot R16(\overline{P27-P23})$$
$$+\theta y=Q1\cdot Q2\cdot\overline{Q3}\cdot\overline{Q4}\cdot R15(\overline{P27-P23})$$
$$-\theta y=Q1\cdot Q2\cdot\overline{Q3}\cdot Q4\cdot R16(\overline{P27-P23})$$
$$+\theta z=Q1\cdot Q2\cdot Q3\cdot\overline{Q4}\cdot R15(\overline{P27-P23})$$
$$-\theta z=Q1\cdot Q2\cdot Q3\cdot\overline{Q4}\cdot R16(\overline{P27-P23})$$

Discrete outputs may be produced by decoding the value in the input-output address register 22. Four four-bit combinations of G1–G2 define such outputs, producing a total of 128 possible combinations.

| G1 | G2 | G3 | G4 |
|---|---|---|---|
| 1 | 1 | 0 | 0 |
| 1 | 1 | 0 | 1 |
| 1 | 1 | 1 | 0 |
| 1 | 1 | 1 | 1 |

If a discrete output is programmed, the output of the decoding matrix is true as long as the information remains static in the input-output address register 22. The least five bits of register do not shift. The H1 and H2 phasing control flip-flops remain in the zero state because H1 is not allowed to set if $G1\cdot G2=1$.

$$h_1=\overline{H2}\quad \text{C.A.}=P0\cdot\overline{H1}\cdot\overline{H2}\cdot INO\cdot\overline{G1\cdot G2}$$
$$\text{C.A. for } G5\text{–}G9=H1(P27\text{–}P23)$$

Serial outputs are obtained by left shifting data contained on the S1 register. One bit is shifted each cycle, using the Shift Left order as in FIGURE 9, into a flip-flop S16 (FIGURE 13) which is read by some external device. Determination of which of two external devices #1 or #2 is to read the flip-flop S16 is controlled by gates GF and GP which, in turn, are controlled by the word identification code in the word identifier register 26. The bit read out of each cycle is derived from the S1 word preceding the one in which the word code occurs.

$$s_{16}=S1;\ \text{C.A.}=P0$$
$$g_f=\overline{Q1}\ \overline{Q2}\ Q3\ Q4(\overline{P27-P23})$$
$$g_p=\overline{Q1}\ \overline{Q2}\ \overline{Q3}\ Q4(\overline{P27-P23})$$

The invention provides, therefore, an improved input-output system for use with a general purpose computer. The improved input-output system of the invention is capable, not only of buffering inputs and outputs for the general purpose computer, but also of performing certain internal operations so as to extend the capabilities of the general purpose computer.

It will be appreciated, of course, that while a particular embodiment of the invention may have been shown and described, modifications may be made. It is intended in the following claims to cover all such modifications which come within the scope of the invention.

What is claimed is:

1. An input-output system for use with a general purpose computer for extending the capabilities of said general purpose computer, said input-output system including: a first circulating register for holding information as a plurality of multi-bit binary words, and a first adder network connected thereto and through which the contents of said first register are circulated; input means coupled to said first adder network of said first circulating register for feeding input signals thereto representing positive and negative increments of predetermined functions to be added to the contents of said first circulating register; a second circulating register for holding information as a plurality of multi-bit binary words, and a further adder network connected thereto and through which the contents of said second register are circulated; an order register coupled to at least one of said circulating registers for deriving a portion of each of said multi-bit binary words therefrom, such portion including instruction bits representing an order code; circuit means coupling said first register to said further adder network of said second register to cause the contents of said first register to be added in said further adder network to the contents of said second register; and logic control circuitry coupled to said circuit means and to said order register to render said circuit means operative in response to a predetermined order code established by said instruction bits in said order register.

2. An input-output system for use with a general purpose computer including: a first circulating register for holding information as a plurality of binary words; input means coupled to said first circulating register for feeding input signals thereto; a second circulating register for holding binary information as a plurality of binary words, and an adder network connected thereto and through which the contents of said second register are circulated; an order register coupled to at least one of said circulating registers for deriving a portion of each of said binary words therefrom, such portion including instruction bits representing an order code; circuit means coupling said first circulating register to said adder network of said second circulating register to cause the contents of said first circulating register to be added in said adder network to the contents of said second circulating register; and logic circuitry coupled to said circuit means and to said order register to render said circuit means operative in response to a predetermined order code established by said instruction bits in said order register.

3. An input-output system for use with a general purpose computer including: a first circulating register and a first two-input adder network connected thereto and through one input of which the contents of said first circulating register are circulated; input means coupled to the other input of said first adder network of said first circulating register for feeding input signals thereto representing increments of a function, said increments being stored in said first circulating register as a multi-bit binary number; a second circulating register in which said increments are further stored as a multi-bit binary number, and a further two-input adder network connected thereto and through one input of which the contents of said second circulating register are circulated; an order register coupled to at least one of said first and second circulating registers for deriving a portion of said multi-bit binary number therefrom, such portion including instruction bits representing an order code; circuit means coupling said first circulating register to the other input of said further adder network of said circulating register to cause the multi-bit binary number in said first circulating register to be added in said further adder network to said multi-bit binary number in said second circulating register and to cause the resulting multi-bit binary number to be stored in said second circulating register; and logic control circuitry coupled to said order register and to said circuit means to render said circuit means operative in response to a predetermined order code established by said instruction bits in said order register.

4. The system defined in claim 3 and which includes circuit means coupled to one of said first and second circulating registers and to the other input of the corresponding one of said adder networks connected thereto for causing said multi-bit binary number therein to be shifted from one bit position to the next for each successive circulation of the contents of said circulating register; and in which said logic circuitry is coupled to said last-mentioned circuit means to render such circuit means operative in response to a predetermined different order code established by the instruction bits in said order register.

5. An input-output system for use with a general purpose computer including: a first circulating register for holding information as a plurality of multi-bit binary words, and in which a portion of each such word represents an address code identifying the binary words in said register, and a first adder network connected thereto and through which the contents of said first circulating register are passed; a second circulating register for holding information as a plurality of multi-bit binary words, and in which a portion of each such word represents different order codes, and a second adder network connected thereto and through which the contents of said second register are passed; a word identifier register coupled to said first circulating register for deriving said address portion from each of said multi-bit binary words therein; an order register coupled to said second circulating register for deriving said order portion from each of said multi-bit binary words therein; circuit means coupled to said first and second adder networks to perform predetermined logic operations on the contents of said first and second registers; and logic control circuitry coupled to said word identifier and order registers and to said circuit means to cause said circuit means to perform such different logic operations in response to different order codes established in said order register and on selected ones of said multi-bit binary words as specified by different address codes established in said word identifier register.

6. The input-output system defined in claim 5 and which includes a circuit for feeding information from the computer to said first and second registers, and further circuit means included in said last-mentioned circuit and coupled to said logic control circuitry and responsive to particular address codes and order codes in said word identifier and order registers for transferring a multi-bit binary word from the computer to a selected word position in a selected one of said first and second circulating registers.

7. An input-output system for use with a general purpose computer including: a circulating register for holding information as a plurality of multi-bit binary words; a two-input adder network coupled to said circulating register and through one input terminal of which the contents of said circulating register are passed; an order register coupled to said circulating register for deriving a portion of each of said multi-bit binary words therefrom, such portion including instruction bits representing an order code; circuit means coupled to the other input terminal of said adder network to cause predetermined logic operations to be performed on the contents of said circulating register; and logic circuitry coupled to said order register and to said circuit means and responsive to different order codes established by said instruction bits in said order register selectively to cause different logic operations to be performed on the contents of said circulating register.

8. An input-output system for use with a general purpose computer including: a first circulating register for holding information as a plurality of multi-bit binary words; a second circulating register for holding information as a plurality of multi-bit binary words; a two-input adder network connected to said second circulating register and through one input of which the contents of said second circulating register are passed; an order register coupled to one of said circulating registers for deriving a portion of each of said multi-bit binary words therefrom, such portion including instruction bits representing an order code; circuit means coupled to said first circulating register and to the other input of said adder network to cause predetermined logic operations to be performed on the contents of said second circulating register; and logic circuitry coupled to said order register and to said circuit means and responsive to different order codes established by said instruction bits in said order register selectively to cause said first circulating register to be connected to the other input of said adder network and selectively to cause said different logic operations to be performed on the contents of said second circulating register.

9. An input-output system for use with a general purpose computer including: a first circulating register for holding information as a plurality of multi-bit binary words, and a first two-input adder network connected thereto and through one input of which the contents of said first circulating register are passed; a second circulating register for holding information as a plurality of multi-bit binary words, and a second two-input adder network connected thereto and through one input of which the contents of said second circulating register are passed; an order register coupled to one of said circulating registers for deriving a portion of each of said multi-bit binary words therefrom, such portion including instruction bits representing an order code; circuit means coupled to the other input of said first and second adder networks to cause predetermined logic operations to be performed on the contents of said first and second circulating registers; and logic circuitry coupled to said order register and to said circuit means and responsive to different order codes established by said instruction bits in said order register to cause said different logic operations to be peformed on the contents of said first and second circulating registers.

References Cited

UNITED STATES PATENTS

| | | | |
|---|---|---|---|
| 2,874,901 | 2/1959 | Holmes | 235—157 |
| 2,965,297 | 12/1960 | Alrich | 235—157 |
| 2,978,680 | 4/1961 | Schulte | 340—172.5 |
| 3,050,251 | 8/1962 | Steele | 235—164 |
| 3,119,928 | 1/1964 | Skramstad | 235—150 |
| 3,153,225 | 10/1964 | Merner et al. | 340—172.5 |
| 3,161,763 | 12/1964 | Glaser | 235—157 |
| 3,237,168 | 2/1966 | Hertz | 340—172.5 |
| 3,274,376 | 9/1966 | Evans et al. | 235—150.31 |

MALCOLM A. MORRISON, *Primary Examiner.*

K. MILDE, *Assistant Examiner.*